United States Patent [19]
Phillips, Sr.

[11] Patent Number: 5,180,260
[45] Date of Patent: Jan. 19, 1993

[54] CHAMFERING REAMER WITH TRIP SHOULDER

[76] Inventor: Douglas B. Phillips, Sr., 4124 Greenleaf, Spring, Tex. 77389

[21] Appl. No.: 818,769

[22] Filed: Jan. 13, 1992

[51] Int. Cl.⁵ .............................................. B23B 5/16
[52] U.S. Cl. .................................. 408/211; 408/203; 408/225
[58] Field of Search .............................. 408/190–193, 408/201–203, 211, 224, 225, 223, 227; 82/113

[56] References Cited

U.S. PATENT DOCUMENTS 4,468,829  9/1984  Christensen ..................... 408/211 X
4,930,946  6/1990  Phillips, Sr. ..................... 408/224 X

FOREIGN PATENT DOCUMENTS 2518187  11/1976  Fed. Rep. of Germany ...... 408/211
2617724  11/1977  Fed. Rep. of Germany ...... 408/191

*Primary Examiner*—Steven C. Bishop
*Attorney, Agent, or Firm*—Kenneth A. Roddy

[57] ABSTRACT

A adjustable chamfering reamer used in automated threading machines for reaming the ends of pipe or conduit. The adjustable chamfering reamer has an inner reamer insert adjustably installed within a generally cylindrical outer sleeve. The front of the outer sleeve has circumferentially spaced forwardly extending projections with a flat inwardly and rearwardly angled reaming surface and a trip shoulder at the bottom thereof. The inner reamer insert has a trunched conical forward end defined by a plurality of circumferentially spaced longitudinal wings extending rearwardly and outwardly from the forward end and the exterior of the wings are curved reaming surfaces. When assembled, the wings are positioned between the projections of the outer sleeve in alternating relation. When viewed from the side, the overlapped reaming surfaces and shoulders form a plurality of rearwardly extending flat-bottom V-shaped grooves. The width of the flat-bottom V-shaped groove can be adjustably altered by positioning the inner reamer insert relative to the outer sleeve to receive pipe or conduit of various wall thicknesses and to ream the exterior and interior diameters at the end of the pipe or conduit simultaneously. The adjustable reamer is secured in the die head of a threading machine and receives the end of a pipe or conduit during the threading operation.

16 Claims, 3 Drawing Sheets

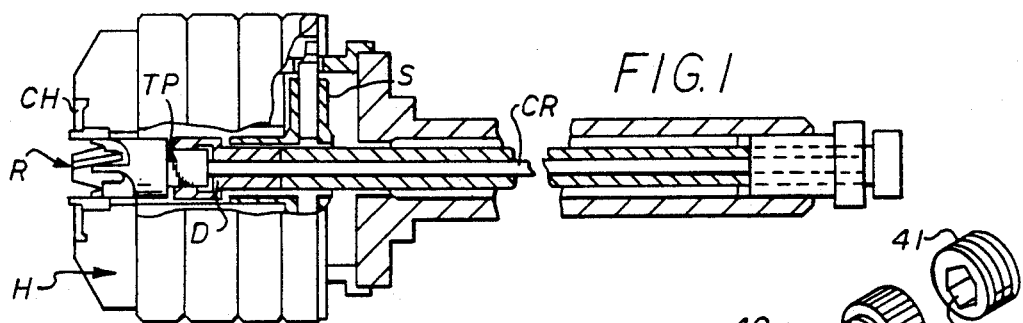
FIG. 1
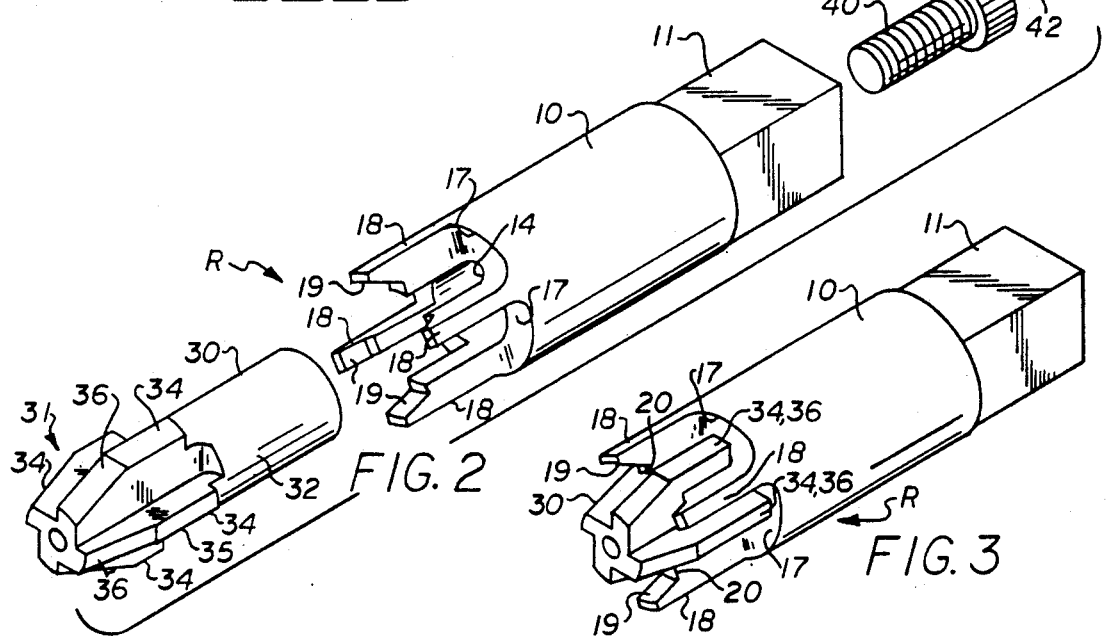
FIG. 2
FIG. 3
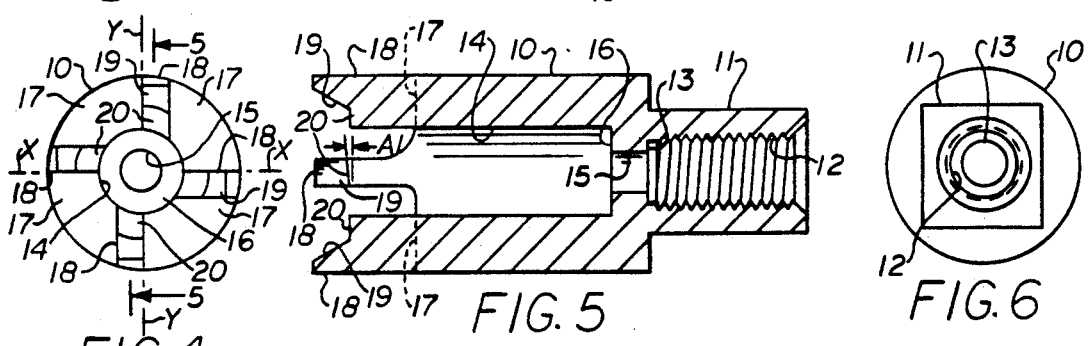
FIG. 4
FIG. 5
FIG. 6
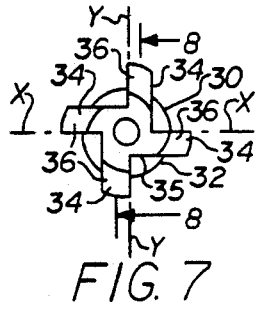
FIG. 7
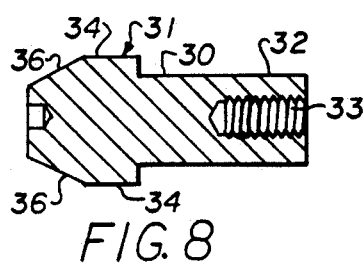
FIG. 8
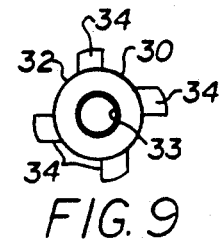
FIG. 9

CHAMFERING REAMER WITH TRIP SHOULDER

BACKGROUND OF THE INVENTION

1. FIELD OF THE INVENTION

This invention relates generally to reamers, and more particularly to an adjustable chamfering reamer for use in threading machines which has an inner reamer member adjustably carried in an outer reaming member such that the reaming surfaces can be selectively positioned relative to one another to chamfer the exterior and interior of the threaded end of pipe or conduit and which has a trip shoulder for activating the chaser holder of the threading head to release the chamfered piece upon completion of the threading and chamfering operation.

2. BRIEF DESCRIPTION OF THE PRIOR ART

Chamfering reamers are secured by an adjustable draw bar in the threading head member of a threading machine and chamfer the ends of a pipe or conduit to remove the burr from the inside or outside diameter of the pipe or conduit after it has been threaded.

Some reamers, such as those manufactured by Teledyne Landis Machine of Waynesboro, Pennsylvania have fixed reaming surfaces and are designed to chamfer the inside and outside diameter of the pipe or conduit simultaneously. This type of reamer has a fluted body forming longitudinal wings which have an integral rearwardly extending, flat-bottom, generally V-shaped groove in the front portion of each wing. The converging inner sides of the V-groove chamfer the material and the flat bottom of the V-groove serves as a stop bar during the threading operation by forceably contacting the end of the pipe or conduit sufficient to activate a trip release within the threading machine to release the chamfered piece.

Prior art reamers having fixed reaming surfaces frequently become worn and require replacement or re-grinding of the cutting surfaces. The suggested method of resharpening or grinding is to grind on the flat side of each wing. This seriously impairs the useful life of the reamer because it reduces the cross section of the wing and changes the geometry of the cutting edges. The thinner reworked wings are often broken because the outer side wall of the flat bottom V-shape is thin and has a vulnerable stress point. The flat bottom tripping surface of the V-groove does not provide a desirable relief angle, and results in chip build-up which often causes damage to the first threads or even tearing off the end of the pipe. The flat bottom tripping surface of the V-groove is perpendicular to the longitudinal axis, and will also often gouge or damage the end of the pipe or conduit when forcible contact is made during the tripping sequence.

Another common problem with chamfering reamers is the down-time or loss of production caused by the necessity of frequent replacement and re-setting of a new reamer to accommodate pipe or conduit having a different wall thickness.

Teledyne Landis Machine of Waynesboro, Pennsylvania at one time marketed a two-piece reamer designed to chamfer the inside and outside diameter of the pipe or conduit. The reamer had a truncated nose piece with reaming wings which was bolted onto the front of a fluted body to form a rearwardly extending, flat-bottom, generally V-shaped groove. The flat-bottom of the V-groove served as a stop bar during the threading operation by forceably contacting the end of the pipe or conduit sufficient to activate a trip release within the threading machine to release the chamfered piece. The flat bottom tripping surface of the V-groove was perpendicular to the longitudinal axis and did not provide a relief angle. The reaming surfaces were fixed, and the nose piece was not adjustably positioned relative to the fluted body.

Other two-piece reamers are known in the art. There are several patents which disclose reamers and cutting tools of various configuration.

German patent 25 18 187 discloses a manual two-piece deburring tool designed to be secured in a handle and held in the hand to simultaneously chamfer the inside and outside diameter of the pipe or conduit. The reamer has a toothed inner cutter which is carried in an outer cutter member with the teeth of the inner cutter member pointing into the gaps between the teeth of the outer cutter member to form a V-shaped groove with the cutter surfaces forming a sharp bottom V-groove. The tool would not be suitable for use in a threading machine and there is no provision of a tripping shoulder to activate a trip release within the threading machine.

Tyne, U.S. Pat. No. 2,188,584 discloses a reamer designed to chamfer the inside and outside diameter of the pipe or conduit. The reamer has a central body with slots which receive replaceable reamer blade inserts which are bolted into the front of the body by a central bolt and washer. The removable reamer insert blades each have an integral rearwardly extending, flat-bottom, generally V-shaped groove formed therein. The flat bottom of the V-groove serves as a stop surface to activate a trip release within the threading machine to release the chamfered piece. The flat bottom tripping surface of the V-groove is perpendicular to the longitudinal axis and does not provide a relief angle. The reaming surfaces are fixed, and not capable of being adjustably positioned relative to one another.

Christensen, U.S. Pat. No. 4,468,829 discloses manual two-piece cleaning and deburring tool designed to be held in the hand to clean and deburr spent cartridge cases. The tool has an inner member carried in an outer member with the forward ends of the inner and outer member forming a segmented V-shaped groove which will deburr the interior and exterior surfaces of a spent cartridge case when the cartridge case is rotated relative to the tool. This tool would not be suitable for use in a threading machine and there is no provision of a tripping shoulder to activate a trip release within the threading machine.

Phillips, U.S. Pat. No. 4,930,946 discloses a two-piece chamfering reamer having an inner body with a truncated conical forward end defined by circumferentially spaced longitudinal wings with a reaming surface on their exterior and a trip shoulder at their rearward end and an outer sleeve which is secured on the inner body. The outer sleeve has forwardly extending projections with inwardly angled reaming surfaces. When assembled, the reaming surfaces of the projections are in circumferential alignment with the wings and the inner body is not adjustably positioned relative to the outer sleeve.

The present invention is distinguished over the prior art in general, and these patents in particular by an adjustable chamfering reamer used in automated threading machines for reaming the ends of pipe or conduit. The adjustable chamfering reamer has an inner reamer insert adjustably installed within a generally cylindrical outer sleeve. The front of the outer sleeve has circumferentially spaced forwardly extending projections with a flat inwardly and rearwardly angled reaming surface and a trip shoulder at the bottom thereof. The inner reamer insert has a truncated conical forward end defined by a plurality of circumferentially spaced longitudinal wings extending rearwardly and outwardly from the forward end and the exterior of the wings are curved reaming surfaces. When assembled, the wings are positioned between the projections of the outer sleeve in alternating relation. When viewed from the side, the overlapped reaming surfaces and shoulders form a plurality of rearwardly extending flat-bottom V-shaped grooves. The inner reaming surfaces provide sufficient clearance to pass under the thread chaser to ream the inside of the pipe or conduit while the outer reaming surfaces of the projections pass between the chasers to ream the outside and provide a limit or trip shoulder. The width of the flat-bottom V-shaped groove can be adjustably altered by positioning the inner reamer insert relative to the outer sleeve to receive pipe or conduit of various wall thicknesses and to ream the exterior and interior diameters at the end of the pipe or conduit simultaneously.

SUMMARY OF THE INVENTION

It is therefore an object of the present invention to provide an adjustable reamer for simultaneously chamfering the outside and inside diameters at the end of a threaded pipe or conduit during the threading operation.

It is another object of this invention to provide an adjustable reamer for chamfering the outside and inside diameters at the end of a threaded pipe or conduit which has a trip shoulder that contacts the end of the pipe or conduit during the threading operation to activate a trip release mechanism within the die head of a threading machine to release the threaded piece after the predetermined number of threads have been cut.

Another object of this invention is to provide an adjustable reamer having an inner reamer insert adjustably installed within a generally cylindrical outer sleeve to define a conical, flat-bottom, V-shaped reaming surface wherein the width of the V-shaped reaming surface can be adjustably altered by positioning the inner reamer insert relative to the outer sleeve to receive pipe or conduit of various wall thicknesses and to ream the exterior and interior diameters at the end of the pipe or conduit simultaneously.

Another object of this invention is to provide an adjustable reamer having reaming surfaces and a trip shoulder which may be easily renewed by grinding when they become worn.

Another object of this invention is to provide an adjustable reamer with inwardly converging reaming surfaces and a trip shoulder at the inward ends thereof which are angled relative to one another to prevent damage to the end of the pipe or conduit during the reaming and tripping operation.

A further object of this invention is to provide an adjustable reamer having a flat-bottom, V-shaped conical reaming portion for chamfering the outside and inside diameters at the end of a threaded pipe or conduit simultaneously and an angular trip shoulder at the bottom of the V-shape which forceably contacts the end of the pipe or conduit to limit the reaming operation and provides sufficient force to trip the threading head of the threading machine after the predetermined number of threads have been cut.

A still further object of this invention is to provide a reamer which is simple in construction and is rugged and durable in use.

Other objects of the invention will become apparent from time to time throughout the specification and claims as hereinafter related.

The above noted objects and other objects of the invention are accomplished by an adjustable chamfering reamer used in automated threading machines for reaming the ends of pipe or conduit. The adjustable chamfering reamer has an inner reamer insert adjustably installed within a generally cylindrical outer sleeve. The front of the outer sleeve has circumferentially spaced forwardly extending projections with a flat inwardly and rearwardly angled reaming surface and a trip shoulder at the bottom thereof. The inner reamer insert has a truncated conical forward end defined by a plurality of circumferentially spaced longitudinal wings extending rearwardly and outwardly from the forward end and the exterior of the wings are curved reaming surfaces. When assembled, the wings are positioned between the projections of the outer sleeve in alternating relation. When viewed from the side, the overlapped reaming surfaces and shoulders form a plurality of rearwardly extending flat-bottom V-shaped grooves. The inner reaming surfaces provide sufficient clearance to pass under the thread chaser to ream the inside of the pipe or conduit while the outer reaming surfaces of the projections pass between the chasers to ream the outside and provide a limit or trip shoulder. The width of the flat-bottom V-shaped groove can be adjustably altered by positioning the inner reamer insert relative to the outer sleeve to receive pipe or conduit of various wall thicknesses and to ream the exterior and interior diameters at the end of the pipe or conduit simultaneously.

BRIEF DESCRIPTION OF THE DRAWINGS

FIG. 1 is a schematic side elevation of a die head member of a pipe threading machine having an adjustable chamfering reamer with a trip shoulder in accordance with the present invention installed in the bore.

FIG. 2 is an exploded isometric view of the adjustable chamfering reamer with trip shoulder in an unasssembled condition.

FIG. 3 is an isometric view of the adjustable chamfering reamer with trip shoulder in an assembled condition.

FIG. 4 is a front end view of the outer sleeve of the adjustable chamfering reamer with trip shoulder.

FIG. 5 is a longitudinal cross section of the outer sleeve of the adjustable chamfering reamer with trip shoulder taken along line 5—5 of FIG. 4.

FIG. 6 is a rear end view of the outer sleeve of the adjustable chamfering reamer with trip shoulder.

FIG. 7 is a front end view of the adjustable inner reamer insert of the adjustable chamfering reamer with trip shoulder.

FIG. 8 is a longitudinal cross section of the adjustable inner reamer insert of the adjustable chamfering reamer with trip shoulder taken along line 8—8 of FIG. 7.

FIG. 9 is a rear end view of the adjustable inner reamer insert of the adjustable chamfering reamer with trip shoulder.

DESCRIPTION OF THE PREFERRED EMBODIMENT

Figure 10:
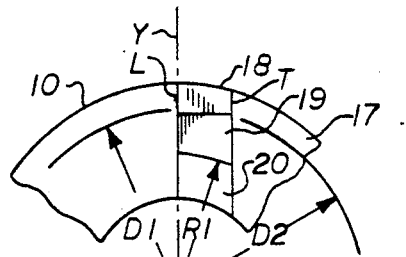
FIG. 10 is an enlarged front end view of a portion of one of the projections of the outer sleeve showing the inclined reaming surface and trip shoulder.

For ease of understanding, a brief description of the manner in which the adjustable chamfering reamer with trip shoulder is used will be given first followed by a detailed description of the structural features of the reamer.

Referring to the drawings by numerals of reference, there is shown somewhat schematically in FIG. 1, a conventional tripping die head H of a pipe or conduit threading machine having an adjustable chamfering reamer R in accordance with the present invention installed in the die head bore adjacent the chaser holders CH. The reamer R has a tailpiece TP at its rearward end which is received in the end of a driver member D coupled to the spider S of the conventional internal tripping mechanism which opens the jaws of the die head. The reamer tailpiece TP is threadedly received on the forward end of a clamping rod CR. The reamer R is operatively coupled to the existing tripping die head components and has a trip shoulder at the rearward end of the reaming surfaces which, after the reaming operation, acts as the stop bar for the internal tripping mechanism. The clamping rod CR extends outwardly at the rear of the threading machine for easy access and positions the reamer trip shoulder to trip the release after the predetermined number of threads have been cut.

As the threaded end of a pipe or conduit being threaded progresses into the die head, it is received between the tapered reaming surfaces (described hereinafter) at the forward end of the reamer R. The reamer R has been positioned such that the trip shoulder of the reamer will contact the end of the pipe or conduit after the predetermined number of threads have been cut. The tapered surfaces at the forward end of the reamer R reams and chamfers the external and internal diameter of the pipe or conduit and after the predetermined number of threads have been cut, the end of the pipe or conduit contacts the trip shoulder and provides sufficient resistance force to actuate the internal trip mechanism or spider to release the workpiece and end the cycle.

Referring now to FIG. 2, the preferred adjustable chamfering reamer R is shown in an unasssembled condition and in FIG. 3, in the assembled condition. The adjustable chamfering reamer R is capable of chamfering both the outside and inside diameters of a pipe or conduit simultaneously, and is adjustable to receive pipe or conduit of various wall thicknesses. The reamer R has a cylindrical outer sleeve 10 and an adjustable inner reamer insert 30 which is longitudinally adjustable relative to the outer sleeve, as will be explained hereinafter.

Referring additionally to FIGS. 4, 5, 6, and 10, the cylindrical outer sleeve 10 has a rectangular extension or tailpiece 11 which is square in cross section. A threaded bore 12 extends inwardly from the rearward end of the tailpiece 11 and terminates in a shoulder 13. The threaded bore 12 receives the clamping rod accessory of the threading machine. The cylindrical outer sleeve 10 has a central bore 14 extending inwardly from the forward end and terminating in a smaller bore 15 defining a shoulder 16 therebetween. The outer diameter of the outer sleeve 10 is of sufficient size to be received in the bore of the die head of the threading machine.

The forward end of the outer sleeve 10 has a plurality of circumferentially spaced cut-away portions 17 extending rearwardly to define a plurality of projections 18. The preferred outer sleeve 10 has four projections 18 extending laterally from the horizontal and vertical axes X and Y, but may have anywhere from two to six. The interior surface at the front end of each projection 18 extends angularly rearward and inwardly relative to the longitudinal axis of the outer sleeve to form a reaming surface 19 which terminates in a trip shoulder 20 that extends radially inward to the central bore 14. The preferred angle of the reaming surface 19 is from 20° to 30° relative to the longitudinal axis. The diametrical distance between the outer ends of the reaming surfaces 19 is greater than the exterior diameter of the pipe or conduit being reamed and the inner end of the reaming surface where it joins the shoulder 20 is smaller than the exterior diameter of the pipe or conduit.

As shown in FIG. 10, when viewed from the front end, the projections 18 each have diametrically opposed flat leading edge surfaces L and flat trailing edge surfaces T spaced generally parallel thereto in a clockwise direction from the leading edge surface. Because the flat reaming surfaces 19 extend laterally from the X and Y axes, the distance d1 from the center of the outer sleeve to the leading edge L is shorter than the distance d2 from the center to the trailing edge T. Thus, the inclined reaming surface 19 extends outwardly from the leading edge L to the trailing edge T relative to the central axis of the sleeve. The inner end of the reaming surface 19 where it joins the trip shoulder 20 is cut on a radius r1 and therefore, the trailing edge T of the reaming surface 19 is wider than the leading edge L at the juncture of the reaming surface 19 with the trip shoulder 20. Referring again to FIG. 5, the trip shoulder 20 slopes upwardly toward the front of the outer sleeve 50 at an angle A1 from the leading edge L to the trailing edge T to form an angled tripping surface transverse to the longitudinal axis. The preferred angle A1 is from approximately 1° to 3°.

It should be understood from the foregoing description that as a tubular pipe or conduit is fed into the front portion of the outer sleeve 10 in alignment with the longitudinal axis, the leading edge L of the reaming surfaces 19 will serve as a cutting surface to perform any cutting necessary to remove burrs or material which extend radially outward from the exterior diameter, and as the pipe or conduit continues to be fed onto the reaming surfaces 19, the exterior diameter will contact the inwardly angled reaming surface 19 somewhere near the trailing edge since the trailing edge T is wider than the leading edge L. Thus, the reaming surfaces 19 provide an angled cutting surface with minimum pipe contact area and a smooth reaming surface for chamfering the exterior diameter. Continued longitudinal feeding of the pipe or conduit onto the reaming surfaces will cause its interior diameter to contact the reaming surface at its approximate transition with the trip shoulder 20 near the trailing edge T to apply the tripping force necessary to activate the tripping mechanism, and the angled trip shoulder 20 provides a raised trailing surface to prevent galling.

Referring now to FIGS. 2, 7, 8, 9, and 11, the adjustable inner reamer insert 30 is a generally cylindrical member having a truncated conical front portion 31 and a reduced diameter rear portion 32. The diameter of the rear portion 32 is sufficient to allow it to be slidably received within the central bore 14 of the outer sleeve 10. A threaded bore 33 extends inwardly from the back end of the rear portion 32 for adjustably positioning the inner reamer insert 30 relative to the outer sleeve 10 (as explained hereinafter). The truncated conical front portion 31 has a plurality of circumferentially spaced longitudinal wings 34 separated by recesses or flutes 35 extending rearwardly from the forward end. The preferred inner reamer insert 30 has four wings 34, but may have anywhere from two to six. As seen from the front (FIGS. 7 and 11), the longitudinal wings 34 extend laterally from the horizontal and vertical axes X and Y.

The exterior of each wing 34 tapers rearwardly and outwardly from the front end at an angle relative to the longitudinal axis, then straight rearwardly and the back ends of the wings extend radially inward to the reduced diameter portion 32. The curved outer surfaces at the forward end of the wings 34 form a segmented conical reaming surface 36 for reaming the interior diameter of a pipe or conduit. The straight rearward portion of the wings 34 provide clearance for the thread chaser of the threading machine, while the outer projections 18 pass between the chasers. The conical reaming surface 36 preferably slopes at an angle of from 10° to 15° relative to the longitudinal axis of the inner reamer insert 30.

Figure 11:
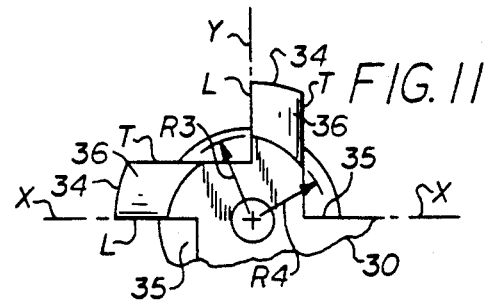
FIG. 11 is an enlarged front end view of a portion of the adjustable inner reamer insert showing the conical reaming surface.

As best seen in FIG. 11, when viewed from the front end, the wings 34 including the conical reaming surface 36 each have diametrically opposed flat leading edge surfaces L and flat trailing edge surfaces T spaced generally parallel thereto in a clockwise direction from the leading edge surface. The curve of the reaming surface 36 is formed such that the leading edge L has a large radius r3 and terminates at the clockwise trailing edge T with a smaller radius r4. In other words, the conical reaming surface 36 is curved radially inward from the leading edge to the trailing edge.

Thus, as a tubular pipe or conduit is fed into the front portion of inner reamer insert 30 in alignment with the longitudinal axis, the leading edge L of the wing reaming surfaces 36 will serve as a cutting surface to perform any cutting necessary to remove burrs or material which extend radially inward from the interior diameter prior to the reaming and tripping operation and the smaller radius trailing edge T will serve as serve as a clearance angle.

Figure 12:
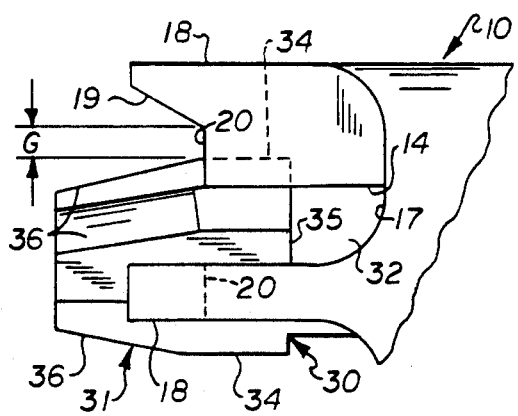
FIG. 12 is an enlarged side elevation of a portion of the adjustable chamfering reamer in the assembled condition showing the inclined reaming surface and trip shoulder of the outer sleeve and the conical reaming surface of the adjustable inner reamer insert.
Figure 13:
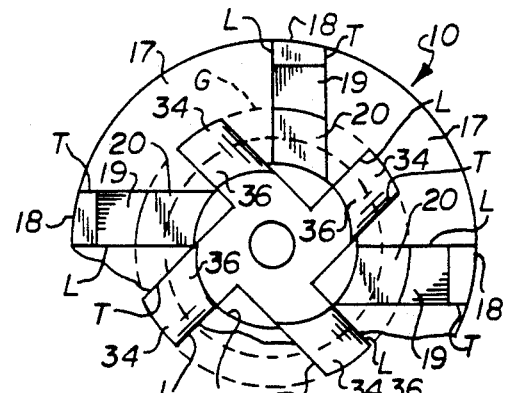
FIG. 13 is an enlarged front end view of a portion of the adjustable chamfering reamer in the assembled condition showing the inclined reaming surface and trip shoulder of the outer sleeve and the conical reaming surface of the adjustable inner reamer insert.
Figure 14:
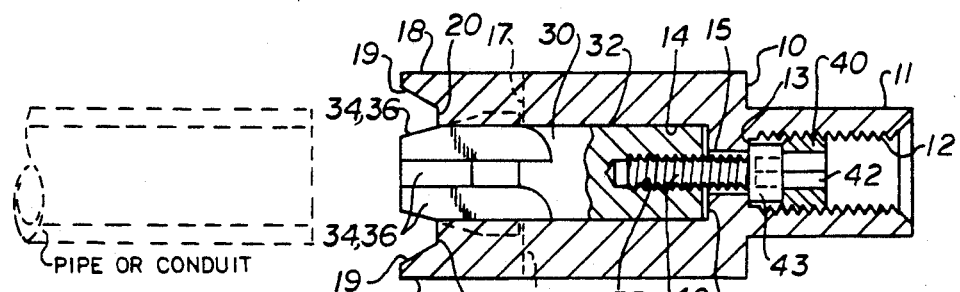
FIG. 14 is a longitudinal cross section of the adjustable chamfering reamer in the assembled condition showing the adjustable reamer insert in rearward position in the outer sleeve.
Figure 15:
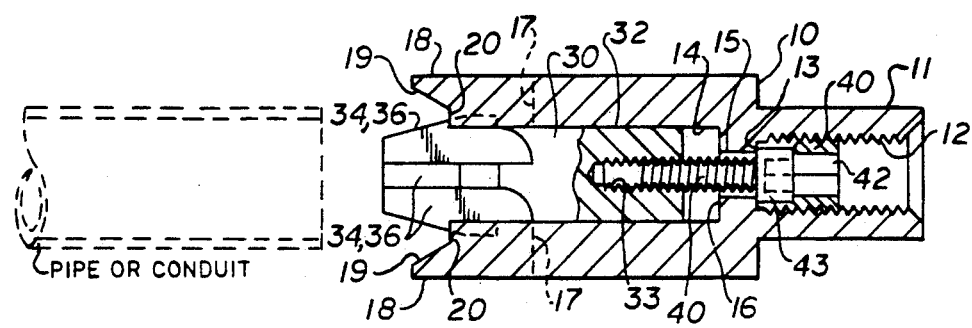
FIG. 15 is a longitudinal cross section of the adjustable chamfering reamer in the assembled condition showing the adjustable reamer insert in forward position in the outer sleeve.

Referring now to FIGS. 3 and 12 through 15, the inner reamer insert 30 is installed in the outer sleeve 10 by sliding the rear portion 32 into the central bore 14 of the outer sleeve 10 from the front end and positioning the wings 34 between the projections 18 of the outer sleeve 10 as shown in FIG. 3. An allen head cap screw 40 is inserted through the threaded bore 12 at the outer sleeve rear portion 11 with its shank extending through the bore 15 and threadedly received in the threaded bore 33 of the rear portion 32 of the inner reamer insert 30 and its head engaged on the shoulder 13. As seen in FIGS. 14 and 15, a threaded lock-down plug 41 having an allen wrench cavity 42 larger than the allen wrench cavity of the cap screw is threadedly received in the threaded bore 12 of the outer sleeve 10.

The cap screw can be rotated by inserting an allen wrench into the socket of the lock-down plug 41 and backing it off a few turns and then inserting a smaller allen wrench through the socket of the lock-down plug and into the socket of the cap screw and rotating it to drive the inner reamer insert 30 forward or backward on the threaded shank of the cap screw. When the cap screw 40 is rotated, the inner reamer insert 30 moves longitudinally on the threaded shank of the cap screw and the insert 30 is prevented from rotating since the side surfaces of the wings 34 will engage the projections 18. After the inner reamer insert 30 is properly positioned, the lock-down plug is then rotated to engage the head 43 of the cap screw 40 and prevent rotation of the cap screw. Thus by rotating the cap screw 40, the forward end of the inner reamer insert 30 can be selectively positioned inward or outward relative to the projections 18 of the outer sleeve 10.

As best seen in FIGS. 12 and 13, when the inner reamer insert 30 is properly installed in the outer sleeve 10, the wings 34 are disposed between the projections 18 and the reaming surfaces 19 and 36 are circumferentially spaced in an alternating pattern. When viewed from the side, each rearwardly and outwardly extending wing 34 overlaps the adjacent shoulder 20 of the outer sleeve 10 and the adjacent angled surfaces 36 and 19 form an inwardly extending, flat-bottom, V-shaped groove G with the trip shoulder 20 forming the bottom of the groove. The inwardly curved reaming surface 36 of the inner reamer insert forms the inner side of the V-shape, the trip shoulder 20 forms the bottom, and the reaming surface 19 of the outer sleeve 10 forms the outer side of the V-shape.

The relative angles of the reaming surface 19, the trip shoulder 20, and the reaming surface 36 are such that as the pipe or conduit is fed onto the reamer, the forward end of the truncated conical portion 31 will receive the end of the pipe or conduit and continued feeding will cause contact of the interior and exterior diameters at the end of the pipe or conduit to contact the converging sides (leading edge L) of the V-shaped groove G sufficient to simultaneously ream the interior and exterior diameters. Continued feeding of the pipe or conduit will cause its exterior diameter to forceably contact the reaming surface 18 near its intersection with the trip shoulder 20 (near the trailing edge T) sufficient to activate the trip mechanism of the die head. The transverse angle of the trip shoulder 20 is sufficient to provide smooth contact with the end surface of the pipe or conduit and prevent galling.

Since the curved reaming surfaces 36 are curved radially inward from the leading edge to the trailing edge and the flat reaming surfaces 19 extend outwardly from the leading edge to the trailing edge, the flat-bottom V-shaped groove G is wider at the clockwise trailing edge than at the leading edge. This flat-bottom V-shaped groove configuration provides minimum pipe contact area while allowing the exterior and interior diameter of the pipe or conduit to forceably contact the reaming surfaces somewhere near the trailing edges and the raised trailing surface of the trip shoulder 20 provides smooth contact with the end of the pipe or conduit to prevent galling.

By adjusting the inner reamer insert 30 relative to the outer sleeve 10, the width of the flat-bottom, V-shaped groove G can be varied to fit pipe or conduit having different wall thicknesses.

ANOTHER EMBODIMENT

Referring now to FIGS. 16 through 20, there is shown another embodiment of the adjustable chamfering reamer R2, which is used for larger diameter pipe or conduit. As with the previously described embodiment, the adjustable chamfering reamer R2 is capable of chamfering both the outside and inside diameters of a pipe or conduit simultaneously, and is adjustable to receive pipe or conduit of various wall thicknesses. The reamer R2 has a cylindrical outer sleeve 50 and an adjustable inner reamer insert 60 which is longitudinally adjustable relative to the outer sleeve.

The cylindrical outer sleeve 50 has a reduced diameter tailpiece 51 at its rearward end. A first threaded bore 52 extends inwardly from the rear end of the tailpiece 51 to receive the clamping rod accessory of the threading machine. A central bore 53 extends inwardly from the forward end and terminates in a second smaller diameter threaded bore 54 defining a shoulder 55 therebetween. The outer diameter of the outer sleeve 50 is of sufficient size to be received in the bore of the die head of the threading machine.

The forward end of the outer sleeve 50 has a plurality of circumferentially spaced cut-away portions 56 extending rearwardly to define a plurality of projections 57. As previously described with reference to FIG. 4, the preferred outer sleeve 50 has four projections 57 extending laterally from the horizontal and vertical axes X and Y, but may have anywhere from two to six. The interior surface at the front end of each projection 57 extends angularly rearward and inwardly relative to the longitudinal axis of the outer sleeve to form a reaming surface 58 which terminates in a trip shoulder 59 that extends radially inward to the central bore 53. The preferred angle of the reaming surface 58 is from 20° to 30° relative to the longitudinal axis. The diametrical distance between the outer ends of the reaming surfaces 58 is greater than the exterior diameter of the pipe or conduit being reamed and the inner end of the reaming surface where it joins the shoulder 59 is smaller than the exterior diameter of the pipe or conduit.

Figure 17:
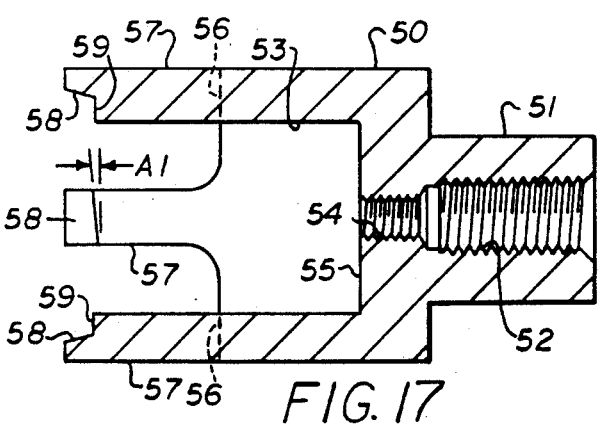
FIG. 17 is a longitudinal cross section of the outer sleeve of the adjustable chamfering reamer of the embodiment of FIG. 16.
Figure 18:
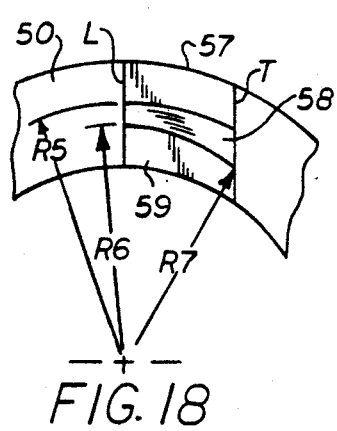
FIG. 18 is an enlarged front end view of a portion of one of the projections of the outer sleeve of the embodiment of FIG. 16 showing the inclined reaming surface and trip shoulder.

As shown in FIG. 18, when viewed from the front end, the projections 57 each have diametrically opposed flat leading edge surfaces L and flat trailing edge surfaces T spaced generally parallel thereto in a clockwise direction from the leading edge surface. The forwardmost end surface of the projections are curved on a radius r5 and the reaming surfaces 58 extend clockwise from the X and Y axes. The inner end of the reaming surface 58 where it joins the trip shoulder 59 is curved such that the leading edge L has a large radius r6 and terminates at the clockwise trailing edge T with a smaller radius r7. In other words, the inner end of the conical reaming surface 58 where it joins the trip shoulder 59 is curved radially inward from the leading edge to the trailing edge. Thus, the inwardly tapered reaming surface 58 is wider at the trailing edge T than at the leading edge L. As seen in FIG. 17, the trip shoulder 59 slopes upwardly toward the front of the outer sleeve 50 at an angle A1 from the leading edge L to the trailing edge T to form an angled tripping surface transverse to the longitudinal axis. The preferred angle A1 is from approximately 1° to 3°.

As a tubular pipe or conduit is fed into the front portion of the outer sleeve 50 in alignment with the longitudinal axis, the leading edge L of the reaming surfaces 58 serve as a cutting surface to perform any cutting necessary to remove burrs or material which extend radially outward from the exterior diameter, and as the pipe or conduit continues to be fed onto the reaming surfaces 58, the exterior diameter will contact the inwardly angled reaming surface 58 somewhere near the trailing edge since the trailing edge T is wider than the leading edge L. Thus, the reaming surfaces 58 provide an angled cutting surface with minimum pipe contact area and a smooth reaming surface for chamfering the exterior diameter. Continued longitudinal feeding of the pipe or conduit onto the reaming surfaces will cause its interior diameter to contact the reaming surface at its approximate transition with the trip shoulder 59 near the trailing edge T to apply the tripping force necessary to activate the tripping mechanism, and the angled trip shoulder 59 provides a raised trailing surface to prevent galling.

Figure 16:
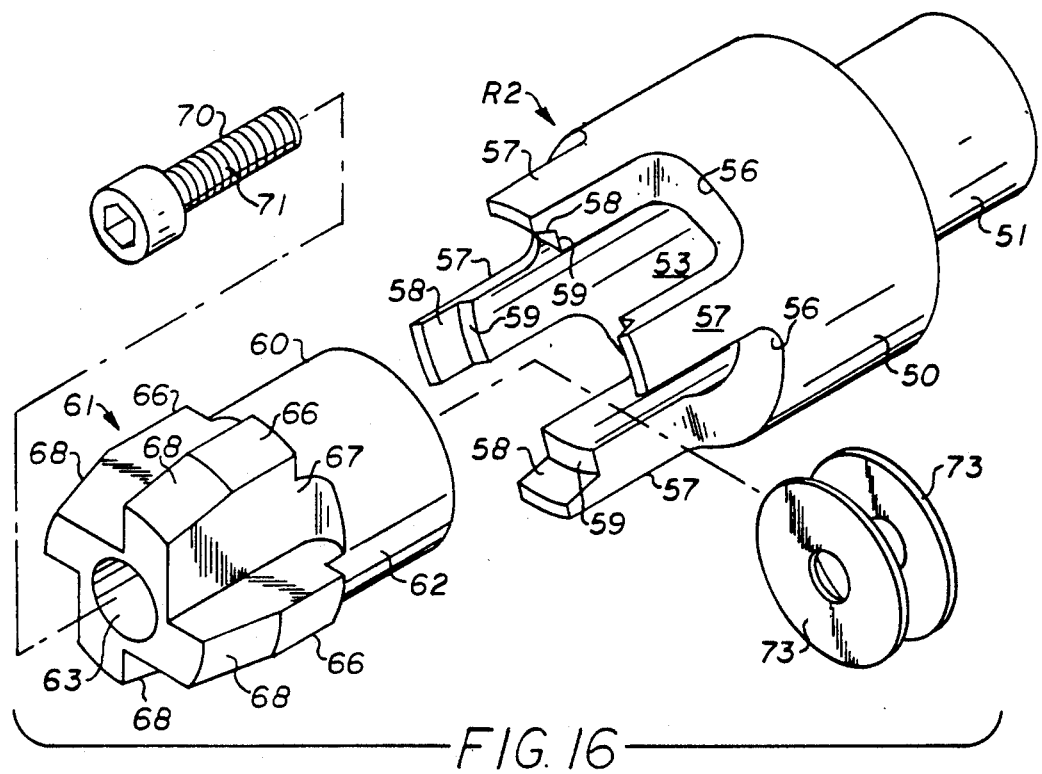
FIG. 16 is an exploded isometric view of an alternate embodiment of the adjustable chamfering reamer with trip shoulder used for larger diameter pipe or conduit, shown in an unasssembled condition.
Figure 19:
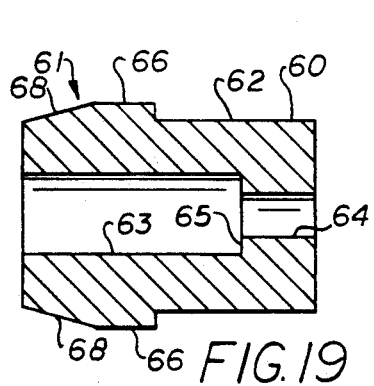
FIG. 19 is a longitudinal cross section of the adjustable inner reamer insert of the adjustable chamfering reamer of the embodiment FIG. 16.
Figure 20:
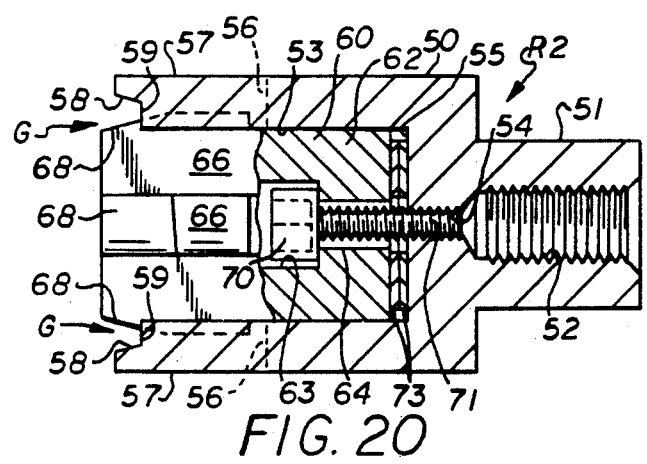
FIG. 20 is a longitudinal cross section of the adjustable chamfering reamer of the embodiment of FIG. 16 shown with the inner reamer insert installed in the outer sleeve.

Referring now to FIGS. 16, 19, and 20, the adjustable inner reamer insert 60 is a generally cylindrical member having a truncated conical front portion 61 and a reduced diameter rear portion 62. The diameter of the rear portion 62 is sufficient to allow it to be slidably received within the central bore 53 of the outer sleeve 50. A central bore 63 extends inwardly from the front end of the inner reamer insert 60 and terminates in a reduced diameter bore 64 defining a shoulder 65 therebetween. The truncated conical front portion 61 has a plurality of circumferentially spaced longitudinal wings 66 separated by recesses or flutes 67 extending rearwardly from the forward end. The preferred inner reamer insert 60 has four wings 66, but may have anywhere from two to six.

The details of the wings and reaming surfaces of the inner reamer insert 60 are the same as previously shown and described with reference to FIGS. 11, 12, and 13, and will not be described in detail to avoid repetition. As previously shown and described with reference to FIG. 11, the longitudinal wings 66 extend laterally from the horizontal and vertical axes X and Y.

The exterior of each wing 66 tapers rearwardly and outwardly from the front end at an angle relative to the longitudinal axis, then straight rearwardly and the back ends of the wings extend radially inward to the reduced diameter portion 62. The curved outer surfaces at the forward end of the wings 66 form a segmented conical reaming surface 68 for reaming the interior diameter of a pipe or conduit. The straight rearward portion of the wings 66 provide clearance for the thread chaser of the threading machine while the projections 57 pass between the chasers. The conical reaming surface 68 preferably slopes at an angle of from 10° to 15° relative to the longitudinal axis of the inner reamer insert 60.

As previously described with reference to FIG. 11, when viewed from the front end, the wings 66 including the conical reaming surface 68 each have diametrically opposed flat leading edge surfaces L and flat trailing edge surfaces T spaced generally parallel thereto in a clockwise direction from the leading edge surface. The curve of the reaming surface 68 is formed such that the leading edge L has a large radius and terminates at the clockwise trailing edge T with a smaller radius. In other words, the conical reaming surface 68 is curved radially inward from the leading edge to the trailing edge.

Thus, as a tubular pipe or conduit is fed into the front portion of inner reamer insert 60 in alignment with the longitudinal axis, the leading edge L of the wing reaming surfaces 68 will serve as a cutting surface to perform any cutting necessary to remove burrs or material which extend radially inward from the interior diameter prior to the reaming and tripping operation and the smaller radius trailing edge T will serve as serve as a clearance angle.

Referring now to FIG. 20, the inner reamer insert 60 is installed in the outer sleeve 50 by sliding the rear portion 62 into the central bore 53 of the outer sleeve 50 from the front end and positioning the wings 66 between the projections 57 of the outer sleeve 50. An allen head cap screw 70 is inserted through the central bore 63 of the inner reamer insert 60 with its shank 71 extending through the reduced bore 64 and threadedly received in the threaded bore 54 of the outer sleeve 50.

One or more thin disc-shaped shims or spacers 73 may be installed between the rear end of the inner reamer insert 60 and the shoulder 55 of the outer sleeve 50 to position the inner reamer insert forward relative to the outer sleeve. The shims or spacers 73 may be removed to retract the inner reamer insert relative to outer sleeve, such that the forward end of the inner reamer insert can be selectively positioned inward or outward relative to the outer sleeve projections.

When the inner reamer insert 60 is properly installed in the outer sleeve 50, the wings 66 are disposed between the projections 58 and the reaming surfaces 59 and 68 are circumferentially spaced in an alternating pattern. When viewed from the side, each rearwardly and outwardly extending wing 66 overlaps the adjacent shoulder 59 of the outer sleeve 50 and the adjacent angled surfaces 68 and 58 form an inwardly extending, flat-bottom, V-shaped groove G with the trip shoulder 59 forming the bottom of the groove. The inwardly curved reaming surface 68 of the inner reamer insert forms the inner side of the V-shape, the trip shoulder 59 forms the bottom, and the reaming surface 58 of the outer sleeve 50 forms the outer side of the V-shape.

The relative angles of the reaming surface 58, the trip shoulder 59, and the reaming surface 68 are such that as the pipe or conduit is fed onto the reamer, the forward end of the truncated conical portion 61 will receive the end the pipe or conduit and continued feeding will cause contact of the interior and exterior diameters at the end of the pipe or conduit to contact the converging sides (leading edge L) of the V-shaped groove G sufficient to simultaneously ream the interior and exterior diameters. Continued feeding of the pipe or conduit will cause its exterior diameter to forceably contact the reaming surface 58 near its intersection with the trip shoulder 59 (near the trailing edge T) sufficient to activate the trip mechanism of the die head. The transverse angle of the trip shoulder 59 is sufficient to provide smooth contact with the end surface of the pipe or conduit and prevent galling.

Since the curved reaming surfaces 68 are curved radially inward from the leading edge to the trailing edge and the inwardly tapered reaming surfaces 59 are wider at the trailing edge, the flat-bottom V-shaped groove G provides minimum pipe contact area while allowing the exterior and interior diameter of the pipe or conduit to forceably contact the reaming surfaces somewhere near the trailing edges and the raised trailing surface of the trip shoulder 59 provides smooth contact with the end of the pipe or conduit to prevent galling.

By adjusting the inner reamer insert 60 relative to the outer sleeve 50, the width of the flat-bottom, V-shaped groove G can be varied to fit pipe or conduit having different wall thicknesses.

The present adjustable reamer R or R2 can also be quickly and easily adjusted to compensate for wear of the cutting and reaming surfaces by positioning the inner reamer insert relative to the outer sleeve. The cutting and reaming surfaces can also be renewed by removing the inner reamer insert from the outer sleeve and re-grinding the surfaces as necessary or simply replacing either of the worn members.

While this invention has been described fully and completely with special emphasis upon a preferred embodiment, it should be understood that within the scope of the appended claims the invention may be practiced otherwise than as specifically described herein.

I claim:

1. An adjustable reaming tool for installation in the bore of a tripping die head of a threading machine for reaming the outside and inside diameters at the end of a threaded pipe or conduit and for activating a trip mechanism to open the die head, the adjustable reaming tool comprising;

a generally cylindrical outer sleeve having a rear end adapted to be secured in a tool holder, a central bore extending rearwardly from the front end and a plurality of circumferentially spaced projections extending forwardly from the front end, the interior surface of each said projection extending rearward and inward at an angel relative to the longitudinal axis to form an inwardly tapered reaming surface to receive and ream the outer diameter at the end of a pipe or conduit received thereon and terminating in a trip shoulder extending radially inward to said central bore and angled transversely to contact the end surface of the pipe or conduit being reamed, said outer sleeve projections including said trip shoulder when viewed from the front end each have diametrically opposed flat leading edge surfaces and a flat tailing edge surface spaced generally parallel thereto in a clockwise direction from said leading edge surface and said inwardly tapered reaming surface extends therebetween, an inner reamer insert having a cylindrical rear portion and a truncated conical forward end longitudinally fluted to define a plurality of circumferentially spaced wings extending longitudinally rearward and outward a distance from the front end at an angle relative to the longitudinal axis to form a segmented generally conical reaming portion to be received partially within the interior diameter of a pipe or conduit to ream the interior diameter at the end of the pipe or conduit received thereon, said inner reamer insert rear portion slidably received within said outer sleeve central bore and said inner reamer insert wings positioned between said outer sleeve projections in alternating relation such that when viewed from the side, each said rearwardly and outwardly extending wing overlaps the adjacent trip shoulder of said outer sleeve projection and the adjacent angled surfaces cooperatively form a plurality of inwardly extending, flat bottom, V-shaped grooves with said trip shoulder forming the bottom of the groove, and longitudinal adjustment means threadedly connected between the rear portions of said inner reamer insert and said outer sleeve along the the longitudinal axis to adjustably position said inner reamer insert wings longitudinally relative to said outer sleeve projections, whereby the width of said flat-bottom, V-shaped grooves can be adjustably altered to receive pipe or conduit of various wall thicknesses and to simultaneously ream the exterior and interior diameters at the end of the pipe or conduit with said trip shoulder contacting the end surface of the pipe or conduit being reamed with sufficient force to activate the trip mechanism of the die head.

2. The adjustable reaming tool according to claim 1 in which;

said inner reamer rear portion has a threaded bore extending inwardly from its rear end, said outer sleeve central bore extends inwardly from its front end and terminates in a smaller diameter bore defining a shoulder therebetween and has a threaded bore larger in diameter than said inner reamer insert threaded bore extending inwardly from its rear end and terminating at said shoulder, and said adjustment means comprises a headed screw installed through the threaded bore of said outer sleeve with its shank extending slidably through said smaller diameter bore and threadedly received in the threaded bore of said inner reamer insert and an externally threaded lock-down plug member threadedly received in the threaded bore of said outer sleeve, whereby said cap screw may be rotated to move said inner reamer insert longitudinally on the threaded shank of said cap screw forward or rearward relative to said outer sleeve to selectively position the forward end of said inner reamer insert relative to said outer sleeve projections, and thereafter said lock-down plug may be rotated to move it into engagement on the head of said cap screw to prevent rotation thereof and maintain the selected position of said inner reamer insert relative to said outer sleeve projections.

3. The adjustable reaming tool according to claim 2 in which;

said headed screw is an allen head cap screw having an allen wrench socket in its head, and said plug member has an allen wrench cavity extending therethrough of larger size than said allen head cap screw socket, whereby said allen head screw is rotated by inserting an allen wrench through said lock-down plug socket and into the head of said cap screw and said lock-down plug can be rotated engage the head of said allen head cap screw with an allen wrench of larger size.

4. The adjustable reaming tool according to claim 1 in which;

said inner reamer insert has central bore extending inwardly from its front end and terminating in a reduced diameter bore defining a shoulder therebetween, said outer sleeve central bore extends inwardly from its front end and terminates in a first threaded bore defining a shoulder therebetween and has a larger diameter threaded bore extending inwardly from its rear end and terminating at said first threaded bore, and said adjustment means comprises a headed screw installed through the central bore of said inner reamer insert with its shank extending slidably through said smaller diameter bore and threadedly received in said first threaded bore of said outer sleeve, and one or more spacer members adapted to be installed between the rear end of said said inner reamer insert and said outer sleeve shoulder, whereby said spacer members may be installed to position said inner reamer insert forward relative to said outer sleeve, and removed to retract said inner reamer insert relative to outer sleeve, such that the forward end of said inner reamer insert can be selectively positioned inward or outward relative to said outer sleeve projections.

5. The adjustable reaming tool according to claim 1 in which;

said wings when viewed from the front end each have diametrically opposed flat leading edge surfaces and a flat trailing edge surface spaced generally parallel thereto in a clockwise direction from said leading edge surface and the exterior surface of said wings form a curved reaming surface extending therebetween.

6. The adjustable reaming tool according to claim 5 in which;

said leading edge surface of each said wing when viewed from the front end has a radius larger than the radius of said trailing edge surface such that said curved reaming surface therebetween curves radially inward from said leading edge to said trailing edge.

7. The adjustable reaming tool according to claim 1 in which;

said inwardly tapered reaming surface and its juncture with said trip shoulder when viewed from the front end extends laterally from said leading edge surface to said trailing edge surface such that the leading edge of said inwardly tapered reaming surface is a smaller radial distance from the central axis than said trailing edge surface.

8. The adjustable reaming tool according to claim 7 in which;

said outer sleeve projection trip shoulder extends transversely at an angle sloping forward from said leading edge surface to said trailing edge surface such that said leading edge of each said trip shoulder is a greater distance from the front of said projection than said trailing edge to provide clearance at said leading edge between the end surface of the pipe or conduit being reamed and allow said transversely angled trip shoulder to contact the pipe or conduit near said trailing edge.

9. The adjustable reaming tool according to claim 8 in which;

said wings when viewed from the front end each have diametrically opposed flat leading edge surfaces and a flat trailing edge surface spaced generally parallel thereto in a clockwise direction from said leading edge surface and the exterior surface of said wings form a curved reaming surface extending therebetween, and said leading edge surface of each said wing when viewed from the front end has a radius larger than the radius of said trailing edge surface such that said curved reaming surface therebetween curves radially inward from said leading edge to said trailing edge, the inwardly curved reaming surface of said inner reamer insert forming the inner side of said V-shaped groove, said trip shoulder forming the bottom, and said inwardly tapered reaming surface of said outer sleeve forming the outer side of said V-shaped groove.

10. The adjustable reaming tool according to claim 9 in which;

said inner reamer insert member is capable of being positioned longitudinally relative to said outer sleeve member to position said curved reaming surface relative to said inwardly tapered reaming surface and said trip shoulder, such that as the adjustable reaming tool is fed axially onto the end of the pipe or conduit, said leading edge of said curved reaming surface will serve as an interior cutting surface to remove burrs of material extending radially inward from the interior diameter of the pipe or conduit, said leading edge of said inwardly tapered reaming surface will serve as an exterior cutting surface to remove burrs of material extending radially outward from the exterior diameter of the pipe or conduit, and continued axial feeding of the adjustable reamer will forceably contact said curved reaming surfaces with the interior diameter of the pipe or conduit and said inwardly tapered reaming surfaces with the exterior diameter of the pipe or conduit at a point near their said trailing edge surfaces to simultaneously ream the interior and exterior diameters at the end of the pipe or conduit.

11. The adjustable reaming tool according to claim 10 in which;

said reamer is installed in the bore of a tripping die head of a threading machine with the rear end of said outer sleeve operatively received within the end of the driver member which activates the internal trip mechanism to pen the die head, and still further continued axial feeding of the adjustable reaming tool will cause said transversely angled trip shoulder to forceably contact the end surface of the pipe or conduit near said trip shoulder trailing edge with sufficient force to activate the trip mechanism of the die head and the leading edge of said trip shoulder providing clearance at said leading edge between the end surface of the pipe or conduit being reamed to prevent galling.

12. The adjustable reaming tool according to claim 1 in which;

said wings extend rearward and outward at an angle of approximately from 10° to 15° relative to the longitudinal axis of said inner reamer insert.

13. The adjustable reaming tool according to claim 1 in which;

said inwardly tapered reaming surfaces extend rearward and inward at an angle of approximately from 20° to 30° relative to the longitudinal axis of said outer sleeve.

14. The adjustable reaming tool according to claim 9 in which;

said trip shoulder extends transversely from said leading edge to said trailing edge at an angle of from approximately 1° to 3°.

15. The adjustable reaming tool according to claim 1 in which;

said inwardly tapered reaming surfaces extend rearward and inward at an angle of approximately from 20° to 30° relative to the longitudinal axis of said outer sleeve, and said trip shoulder extends transversely from said leading edge to said trailing edge at an angle of from approximately 1° to 3°.

16. The adjustable reaming tool according to claim 1 in which;

said wings extend rearward and outward at an angle of approximately from 10° to 15° relative to the longitudinal axis of said inner reamer insert, said inwardly tapered reaming surfaces extend rearward and inward at an angle of approximately from 20° to 30° relative to the longitudinal axis of said outer sleeve, and said trip shoulder extends transversely from said leading edge to said trailing edge at an angle of from approximately 1° to 3°.

* * * * *